(No Model.)
L. PAGET.
SECONDARY BATTERY.
No. 393,576. Patented Nov. 27, 1888.
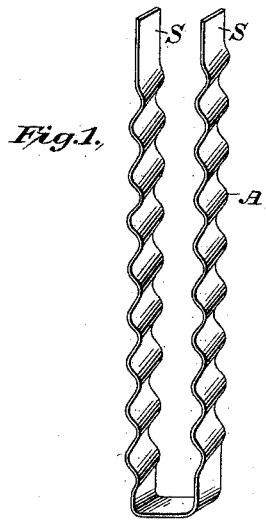
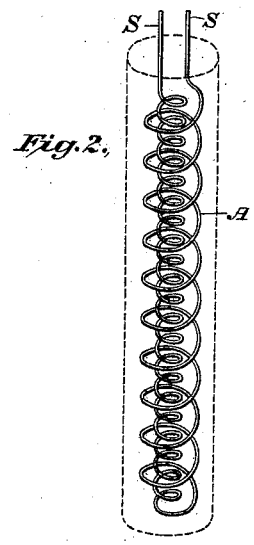
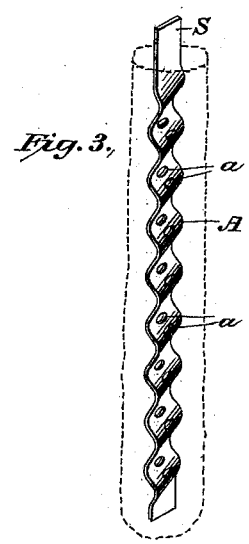
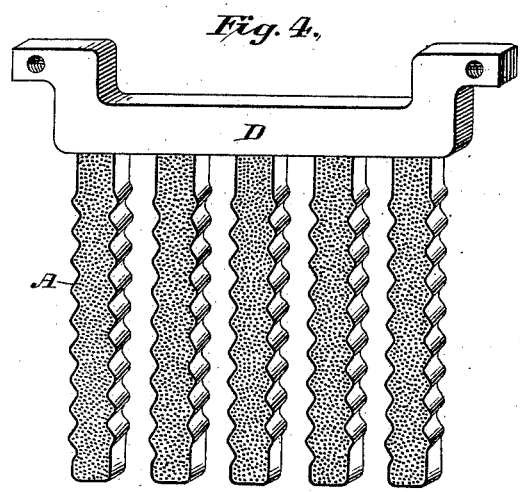
Witnesses,
Geo. W. Breck
Carrie E. Ashley
Inventor.
Leonard Paget,
By his Attorneys
Wiedersheim & Kintner

UNITED STATES PATENT OFFICE.

LEONARD PAGET, OF NEW YORK, N. Y., ASSIGNOR TO THE MACRAEON STORAGE BATTERY COMPANY, OF SAME PLACE.

SECONDARY BATTERY.

SPECIFICATION forming part of Letters Patent No. 393,576, dated November 27, 1888.

Application filed August 8, 1888. Serial No. 282,273. (No model.)

*To all whom it may concern:*

Be it known that I, LEONARD PAGET, a citizen of the United States, residing at New York, in the county of New York and State of New York, have made a new and useful Invention in Secondary or Storage Batteries, of which the following is a specification.

My invention relates particularly to improvements in the construction of the electrodes used in secondary or storage batteries; and its objects are, first, to provide an electrode which shall, as far as possible, be free from the annoying fault known as "buckling;" second, to so construct the electrode as to overcome the fault technically known as "stripping" or "scaling." Buckling, as is well known, is the result of unequal electro-chemical action over the surfaces of the electrode or plate, whereby it is caused to expand unequally and thereby warp or twist the entire plate, thus often rendering the battery useless, or it sometimes is due to inequalities of expansion between the active material or material adapted to become active and the metallic supporting-frame. The fault known as "stripping," "scaling," or "falling off" of the active material or material adapted to become active is due also in a measure to this unequal expansion as well as to a lack of actual cohesion between it and the frame or support, the latter being the chief reason for such disintegration. The active material or material adapted to become active to which I refer is ordinarily composed of an oxide of lead made into a paste with water and then mechanically applied to the support or plate in this pasty condition by pressure or other well-known processes not necessary to enumerate here, said processes, however, producing cohesion between the two parts rather than an actual union, which makes them integral. There results, therefore, in the practice of such processes of uniting the aforesaid parts an inferior union, and therefore there is in addition to the liability to strip off an additional fault in that there is insufficient conducting capacity between the two.

My invention is designed to overcome these objections as far as possible, and it will be fully understood by referring to the specification and claims which follow, taken in connection with the drawings accompanying, in which the figures are all perspective views.

Figure 1 illustrates one form of support in the nature of a corrugated stirrup or loop, in which the active material lies in the stirrup or loop. Fig. 2 illustrates a modified form composed of coiled or spiral wire, two coils in a single piece, one within the other. Fig. 3 illustrates still another modified form in the nature of a single strip of corrugated metal having holes to better retain the active material or material adapted to become active. Fig. 4 represents an electrode entire, with the retaining stirrups or loops in position and showing the active material or material adapted to become active held in place in all of the stirrups or loops.

I take a strip, A, of lead or analogous material, Fig. 1, and corrugate it, as shown, and then bend it in the form of a stirrup or loop having shanks S S. I then place this stirrup or loop in a mold and fill it with a mass of molten active material or material adapted to become active, then allow the whole to cool, thereby firmly uniting the two parts, so that at their point of juncture they are integral. I then arrange a series of these loops or stirrups thus prepared in a row and unite them at their upper ends, by casting or otherwise, to a suspensory conducting-bar, D, around the shanks S S, as clearly indicated in Fig. 4, the lower ends being free or disconnected. This bar has the usual binding attachments for uniting the electrodes and the exterior circuit-connections.

In the form shown in Fig. 2 I cast the molten metal, consisting, preferably, of a lead oxide and a flux, as saltpeter or niter, around the entire compound spiral, as shown by dotted lines, and similarly I cast it about the corrugated strip shown in Fig. 3, the holes $a\,a$ causing firm union between the strip and active material when it cools.

It will be understood that by reason of the peculiar expansible form of the supports shown in Figs. 1, 2, and 3 they may expand and contract with the surrounding or sustained active material, thus avoiding the faults above named. I may cast the active material or material adapted to become active upon the supports indicated by molding it as above noted, or by dipping them into the molten material and removing them, and then repeating the action until the desired thickness of deposited material has been obtained; but I make no claim here to these methods or processes of uniting the active material by casting or molding it upon the support or plate while in a molten state, such methods or processes being involved in another pending application for a patent filed by me in the United States Patent Office of even date herewith and bearing Serial No. 282,272.

I only mention these methods or processes here as being those preferred by me and as giving especially good results, the essential features in the present application being found in the expansible retaining supports, plates, or strips adapted to yield or expand with the active material during the use of the electrode, and also in an electrode constructed in accordance with the methods or processes named, whereby the active material is united to the supports and is integral therewith, such an electrode being properly an article of manufacture adapted for use in a manner well known.

Having thus described my invention, what I claim, and desire to secure by Letters Patent of the United States, is—

1. An electrode for a secondary or storage battery, having the active material or material adapted to become active composed of oxidizable matter integrally attached to one or more corrugated sustaining strips, substantially as described.

2. An electrode for a secondary or storage battery, having the active material or material adapted to become active composed of a salt of lead cast upon the surface of a support, substantially as described.

3. An electrode for a secondary or storage battery, having the active material or material adapted to become active composed of a salt of lead cast upon an expansible support, substantially as described.

4. An electrode for a secondary or storage battery, having the active material or material adapted to become active composed of a salt of lead cast upon a support, which is attached at its upper end to a sustaining-bar and free at its lower end, substantially as described.

5. An electrode for a secondary battery, having the active material or material adapted to become active cast upon corrugated strips attached at their upper ends to a sustaining-bar and free at their lower ends, substantially as described.

6. An electrode for a secondary or storage battery, having the active material or material adapted to become active cast upon the surface of a series of corrugated strips supported or sustained at their upper ends only, substantially as described.

LEONARD PAGET.

Witnesses:
 FRANCIS HOW,
 J. F. QUINN.